United States Patent
Aekbote et al.

(10) Patent No.: US 8,491,007 B2
(45) Date of Patent: Jul. 23, 2013

(54) VARIABLE LATERAL THICKNESS AIRBAG, SYSTEM COMPRISING SAME, AND METHOD OF DEPLOYING SAME

(75) Inventors: Krishnakanth E. Aekbote, Farmington Hills, MI (US); Jialiang Le, Canton, MI (US); Manoharprasad K. Rao, Novi, MI (US); James Chih Cheng, Troy, MI (US)

(73) Assignee: Ford Global Technologies, Dearborn, MI (US)

( * ) Notice: Subject to any disclaimer, the term of this patent is extended or adjusted under 35 U.S.C. 154(b) by 43 days.

(21) Appl. No.: 13/277,788

(22) Filed: Oct. 20, 2011

(65) Prior Publication Data

US 2013/0099467 A1 Apr. 25, 2013

(51) Int. Cl.
*B60R 21/2334* (2011.01)
(52) U.S. Cl.
USPC ................... 280/743.2; 280/734; 280/736
(58) Field of Classification Search
USPC ........... 280/729, 734, 736, 741, 743.1, 743.2
See application file for complete search history.

(56) References Cited

U.S. PATENT DOCUMENTS

| | | | | |
|---|---|---|---|---|
| 5,405,166 | A * | 4/1995 | Rogerson | 280/739 |
| 5,785,347 | A | 7/1998 | Adolph | |
| 6,209,909 | B1 | 4/2001 | Breed | |
| 7,438,313 | B2 * | 10/2008 | Bilbrey et al. | 280/737 |
| 7,441,805 | B2 * | 10/2008 | Jamison et al. | 280/743.2 |
| 7,793,978 | B2 * | 9/2010 | Vigeant et al. | 280/743.2 |
| 7,988,194 | B2 * | 8/2011 | McFadden et al. | 280/743.2 |
| 8,141,900 | B2 * | 3/2012 | Yamazaki | 280/736 |
| 8,262,130 | B2 * | 9/2012 | Fischer et al. | 280/743.2 |
| 2005/0023811 | A1 * | 2/2005 | Thomas | 280/736 |
| 2005/0029785 | A1 * | 2/2005 | Bilbrey et al. | 280/736 |
| 2005/0098990 | A1 * | 5/2005 | Pinsenschaum et al. | 280/739 |
| 2005/0104347 | A1 | 5/2005 | Hawthorn et al. | |
| 2007/0228704 | A1 * | 10/2007 | Cuddihy et al. | 280/735 |
| 2009/0283991 | A1 * | 11/2009 | Honda | 280/729 |

FOREIGN PATENT DOCUMENTS

WO   WO 03080403 A1   10/2003

* cited by examiner

*Primary Examiner* — Drew Brown
*Assistant Examiner* — Timothy Wilhelm
(74) *Attorney, Agent, or Firm* — Angela M. Brunetti; Frank MacKenzie

(57) ABSTRACT

An airbag assembly has an airbag, a gas emitting inflator, and an airbag thickness limiting structure. The airbag thickness limiting structure limits a first body region engaging portion to having a lateral thickness within a first lateral thickness range when the gas emitting inflator delivers a first amount of inflation gas into the interior space of the airbag and allows the first body region engaging portion of the airbag to have a lateral thickness within a second lateral thickness range when the gas emitting inflator delivers a second amount of inflation gas greater than the first amount into the interior space of the airbag. A second body region engaging portion has a substantially fixed maximum attainable lateral thickness. Maximum attainable lateral thickness of the first body region engaging portion of the airbag can be dependent upon whether or not inflation of the airbag is implemented using pre-crash sensing technology.

10 Claims, 2 Drawing Sheets

VARIABLE LATERAL THICKNESS AIRBAG, SYSTEM COMPRISING SAME, AND METHOD OF DEPLOYING SAME

FIELD OF THE DISCLOSURE

The disclosures made herein relate generally to vehicle occupant restraint systems and, more particularly, to method and systems for implementing pre-impact deployment of an airbag.

BACKGROUND

Airbag systems are widely used in the automobile industry and have provided vehicle occupants with enhanced safety for many years. In an automotive vehicle, it is common to position airbags in the hub of the steering wheel, in a recess in the dashboard, in the seats, in the door panels and/or in the body pillars (e.g., the A-pillar, the B-pillar, and C-pillar). Other positions are of course also possible. In any mounting positions, the airbag is required to inflate quickly, at a correct point in time, and at a predictable rate of inflation. For the purpose of simplicity and brevity, inflatable restraints are defined herein to include airbags, curtain bags and the like and a curtain bag is defined herein as a type of airbag.

An airbag of a vehicle is typically in fluid communication with a gas emitting inflator, which in turn is typically in electrical communication with one or more impact sensors. During an impact between the vehicle and another object (e.g., another vehicle, a roadside obstacle, pedestrians, etc.), one or more of the impact sensors (e.g., an accelerometer) detects rapid deceleration of the vehicle in response to the vehicle colliding with the other object. This collision generates an impact pulse that propagates through the vehicle and causes occupants of the vehicle to exhibit relative movement in a direction generally opposite a direction of the impact (e.g., a collision at a particular side of the vehicle will cause relative movement of the occupants toward that particular side of the vehicle). Upon detection of the impact from the collision, the one or more impact sensors will trigger the gas emitting inflator to inflate one or more airbags (i.e., deploy the airbag(s)), which restrains and cushions a vehicle occupant whose movement brings him/her into contact with the deployed airbag. The relative velocities of the vehicle and object involved in the collision will determine whether relative movement of the vehicle occupants is due to inertia of the occupants from movement of the vehicle prior to the collision (e.g., the vehicle is moving and hits a fixed object) and/or from movement of the vehicle initiated by being hit by a moving object (e.g., the vehicle is stationary and is hit by a moving object).

It is known that sensing technologies such as, for example, RADAR (Radio Detection and Ranging), LIDAR (Light Detection and Ranging) and visual imaging can be used in a vehicle for implementing pre-crash sensing of a collision to improve occupant safety. Pre-crash refers to sensing conditions that indicate that a collision between a vehicle and another object is imminent or highly probable. Pre-crash sensing technology has been recognized to have the potential of improving occupant safety by deploying passive restraints devices earlier in a crash, or even before the actual impact. This extra time allows more flexibility for component design and can allow the passive restraints system to be individually tailored to the occupant and crash scenario.

Side impact collisions are a common type of collision for a vehicle. Generally, side impact collisions have a high potential for injuries to vehicle occupants due to the close proximity of the occupants to side structures of the vehicle (e.g., doors, pillars, etc.). To enhance occupant protection in side impact collisions, automobile manufacturers provide adequate side structural stiffness and employ side airbag protection systems. However, due to the close proximity of the occupants of such side structures (e.g., physically closer to an adjacent door than to the steering wheel or dashboard), a side airbag of a side airbag protection system will typically have only a few milliseconds for full deployment before the side structure intrudes into the vehicle occupant compartment and/or an adjacent vehicle occupant moves a substantial distance toward such side structure. Accordingly, the ability of pre-crash sensing to allow for airbag deployment earlier in a collision or even before the actual collision occurs is especially beneficial in side impact collisions.

One approach to benefiting from such improvement in sensing time resulting from pre-crash sensing is an earlier deployment time and the ability to increase a thickness of an airbag that is deployable via pre-crash sensing. The increase in lateral thickness of an airbag increases the cushioning available from the airbag (i.e., the airbag is an inflatable cushion) to an occupant thereby enhancing injury protection afforded by the airbag. However, a typical side airbag protection system employs a single-stage gas emitting inflator (e.g., emits a given amount of gas regardless of specific collision conditions) and an airbag with fixed lateral thickness (i.e., a given volume of bag for a given amount of inflation gas). Because inflation varies as a function of time, an airbag configured for use in a vehicle equipped with pre-crash sensing technologies cannot necessarily be used in a vehicle equipped without pre-crash sensing technologies. This is because of the increased duration of time to implement deployment of an airbag with pre-crash sensing leads to benefits realized through an airbag with greater volume (e.g., increased lateral thickness). As such, if this same large volume airbag were used in a vehicle without pre-crash sensing, an insufficient amount of time would be provided from actual crash detection for allowing a specified degree of inflation of the airbag (i.e., assuming a similar or common volumetric rate of inflation is used with both sensing technologies).

Therefore, an airbag assembly configured to benefit from advanced crash sensing time associated with pre-crash sensing technology and configured in a manner allowing it to be used both in a vehicle with pre-crash sensing technology and in a vehicle without pre-crash sensing technology without modification or reconfiguration would be advantageous, desirable and useful. Also, due to the predict nature of pre-crash sensing using radar, vision, lidar or ultra-sonic sensing systems, in some rare situations, the pre-crash sensing system may not detect a collision situation. Therefore, it is advantageous to use an airbag assembly configured to function effectively in a vehicle equipped with pre-crash sensing system when the pre-crash sensing system does or does not detect a collision situation.

SUMMARY OF THE DISCLOSURE

Embodiments of the present invention are directed to an airbag assembly configured to benefit from advanced crash sensing time associated with pre-crash sensing technology and configured in a manner allowing it to be used both a vehicle with pre-crash sensing technology and a vehicle without pre-crash sensing technology without modification or reconfiguration. A typical airbag assembly (e.g., a side airbag (SAB)) in current vehicle applications includes a gas emitting inflator with single stage output and an airbag with fixed lateral thickness and with no provision to adapt to enhancements offered by optional pre-crash sensing technologies. In contrast, an occupant restraint system configured in accordance with an embodiment of the present invention provides adaptive features by incorporating a multi-stage inflator, a variable thickness airbag assembly, and crash-technology dependent activation of the airbag assembly. In this manner, such an occupant restraint system can be used in a vehicle configured with only conventional crash sensing technology and in a vehicle with pre-crash sensing technology, providing for enhanced occupant performance when used in vehicles with pre-crash sensing technology. Also, such an occupant restraint system will function effectively in a vehicle equipped with a pre-crash sensing system even when the pre-crash sensing system does not detect a collision situation by working in the default single stage activation mode. While a side impact airbag is a preferred airbag for embodiments of the present invention, embodiments of the present invention are not unnecessarily limited to any particular type or location of airbag.

In one embodiment of the present invention, an airbag assembly comprises an airbag including a first body region engaging portion and a second body region engaging portion, a gas emitting inflator coupled to a gas inlet structure of the airbag, and an airbag thickness limiting structure coupled to the first body region engaging portion of the airbag. The airbag has an interior space for receiving inflation gas therein to cause the airbag to transition from an uninflated condition to an inflated condition. The airbag includes a first body region engaging portion and a second body region engaging portion that extends from the first body region engaging portion. The first body region engaging portion and the second body region engaging portion each define a respective vehicle structure facing side and a respective vehicle occupant facing side of the airbag. A distance between the respective vehicle structure facing side and the respective vehicle occupant facing side of each one of the body region engaging portions of the airbag defines a lateral thickness thereof. The interior space of the airbag extends into the first body region engaging portion and the second body region engaging portion. The second body region engaging portion has a substantially fixed maximum attainable lateral thickness. The gas emitting inflator is configured for allowing a plurality of different amounts of inflation gas to be selectively delivered into the interior space of the airbag through the gas inlet structure. The airbag thickness limiting structure is coupled to the first body engaging portion of the airbag for allowing the lateral thickness of the first body region engaging portion to be varied dependent upon an amount of inflation gas delivered into the interior space of the airbag from the gas emitting inflator. The airbag thickness limiting structure limits the first body engaging portion of the airbag to having a lateral thickness within a first lateral thickness range when the gas emitting inflator delivers a first amount of inflation gas into the interior space of the first body engaging portion of the airbag. The airbag thickness limiting structure allows the first body engaging portion of the airbag to have a lateral thickness within a second lateral thickness range when the gas emitting inflator delivers a second amount of inflation gas greater than the first amount into the interior space of the airbag.

In another embodiment of the present invention, an occupant restraint system for a vehicle comprises an airbag, an airbag thickness limiting structure, a gas emitting inflator, and a collision sensing apparatus. The airbag has an interior space for receiving inflation gas therein to cause the airbag to transition from an uninflated condition to an inflated condition. The airbag includes a first body region engaging portion and a second body region engaging portion that extends from the first body region engaging portion. The first body region engaging portion and the second body region engaging portion each define a respective vehicle structure facing side and a respective vehicle occupant facing side of the airbag. A distance between the respective vehicle structure facing side and the respective vehicle occupant facing side of each one of the body region engaging portions of the airbag defines a lateral thickness thereof. An interior space of the airbag extends into the first body region engaging portion and the second body region engaging portion. The second body region engaging portion has a substantially fixed maximum attainable lateral thickness. The airbag thickness limiting structure is coupled to the first body region engaging portion of the airbag for allowing the lateral thickness of the first body region engaging portion to be varied dependent upon an amount of inflation gas delivered into the interior space of the airbag from the gas emitting inflator. The airbag thickness limiting structure limits the first body region engaging portion of the airbag to having a lateral thickness within a first lateral thickness range when a gas pressure within the airbag is below a gas pressure threshold level and allows the first body region engaging portion of the airbag to have a lateral thickness within a second lateral thickness range when the gas pressure within the first body region engaging portion of the airbag exceeds the gas pressure threshold level. The gas emitting inflator is coupled to a gas inlet structure of the airbag and is configured for selectively providing a commanded one of a plurality of different amounts of inflation gas to be delivered into the interior space of the airbag through the gas inlet structure. A first one of the different amounts of inflation gas corresponds to the airbag being inflated to achieve a gas pressure therein below the gas pressure threshold level. A second one of the different amounts of inflation gas corresponds to the airbag being inflated to achieve a gas pressure therein that exceeds the gas pressure threshold level. The collision sensing apparatus is coupled to the gas emitting inflator for activating the gas emitting inflator in response to the collision sensing apparatus determining a collision condition is met. Activating the gas emitting inflator causes the first one of the different amounts of inflation gas to be delivered into the airbag when determining the collision condition is performed without using pre-crash sensor information and causes the second one of the different amounts of inflation gas to be delivered into the airbag when determining the collision condition includes using information from a pre-crash sensor of the collision sensing apparatus.

In another embodiment of the present invention, a method comprises a plurality of operations. An operation is performed for determining a configuration of a sensor arrangement of a collision sensing apparatus of a vehicle available for detecting a collision between the vehicle and another object. An operation is performed for enabling a gas emitting inflator of the vehicle to deliver a first amount of inflation gas into an interior space of an airbag in response to determining that the sensor arrangement is not configured to provide pre-crash sensing information and to deliver a second amount of inflation gas into the interior space of the airbag in response to determining that the sensor arrangement is configured to provide pre-crash sensing information. The airbag includes a first body region engaging portion and a second body region engaging portion that extends from the first body region engaging portion. The first body region engaging portion and the second body region engaging portion each define a respective vehicle structure facing side and a respective vehicle occupant facing side of the airbag. A distance between the respective vehicle structure facing side and the respective vehicle occupant facing side of each one of the body region engaging portions of the airbag defines a lateral thickness thereof. An interior space of the airbag extends into the first body region engaging portion and the second body region engaging portion. The second body region engaging portion has a substantially fixed maximum attainable lateral thickness. The first amount of inflation gas is insufficient for causing an airbag thickness limiting structure of the first body region engaging portion of the airbag to transition from a first airbag thickness configuration to a second airbag thickness configuration as the inflation gas causes the airbag to transition from an uninflated condition to a first fully inflated condition. The second amount of inflation gas is sufficient for causing the airbag thickness limiting structure of the first body region engaging portion of the airbag to transition from the first airbag thickness configuration to the second airbag thickness configuration as the inflation gas causes the airbag to transition from the uninflated condition to a second fully inflated condition. A maximum attainable lateral thickness of the first body region engaging portion of the airbag corresponding to the first fully inflated condition is less than a maximum attainable lateral thickness of the first body region engaging portion of the airbag corresponding to the second fully inflated condition. An operation is performed for activating the gas emitting inflator in response to the collision sensing apparatus determining a collision condition is met thereby causing the inflation gas generated thereby to be delivered into the interior space of the airbag. Activating the gas emitting inflator causes the first amount of inflation gas to be delivered into the interior space of the airbag when the sensor arrangement is determined to not be configured to provide pre-crash sensing information and causes the second amount of inflation gas to be delivered into the interior space of the airbag when the sensor arrangement is determined to be configured to provide the pre-crash sensing information.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
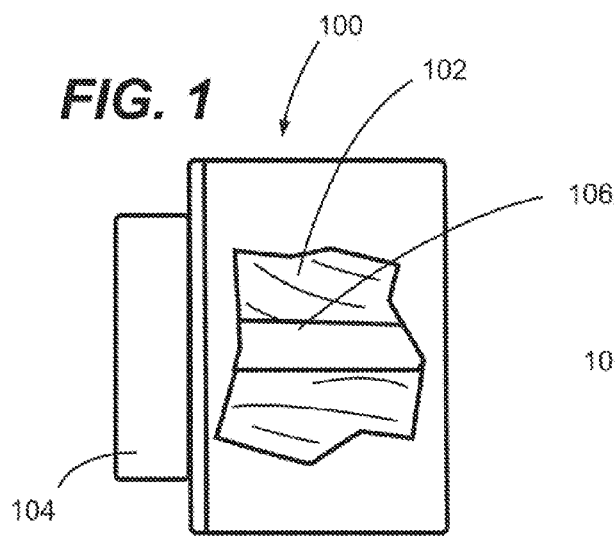
FIG. 1 is an illustrative view showing a side view of an airbag assembly configured in accordance with an embodiment of the present invention with the airbag uninflated within a protective enclosure of the airbag assembly.

An impact sensing apparatus is one example of a collision sensing apparatus. As its name implies, a restraint deployment signal of an impact sensing apparatus is initiated in response to an impact between a vehicle having the impact sensing apparatus and another object. Depending on the circumstances, the impact can be a result of movement of the vehicle, movement of the other object, or both. In response to an impact being sensed, a typical side impact sensing apparatus issues a restraint deployment signal for inflatable restraints in 5 ms to 6 ms after impact for high speed cart tests and 9 ms to 12 ms after impact for pole tests. Accordingly, the elapsed time between sensing the impact and issuing the restraint deployment signal has implications for the design of a side airbag (SAB), for example, its lateral thickness and operating pressure. The lateral thickness of SAB that can be deployed between an occupant of a vehicle and an interior structure of the vehicle (e.g., a door trim panel) is dependent on the crash sensing time and rate of gap closure between door trim and occupant. The operating pressure within the SAB is a function of the biomechanical load limit for dummies to achieve a target occupant performance such as, for example, a peak force/pressure from a SAB for a given rib deflection target.

Embodiments of the present invention utilize information from one or more pre-crash sensors to advance the crash sensing time. In the context of the present invention, advancing the crash sensing time refers to sensing a collision condition earlier than that when an impact initiates sensing of such impact. In this regard, the pre-crash sensor information indicates an impending collision between a vehicle and another object. Examples of pre-crash sensor technologies include, but are not limited to, using a RADAR (Radio Detection and Ranging) based technology to sense an impending collision, using vision-based technology (e.g., a camera) to sense an impending collision, using a LIDAR (Light Detection and Ranging) technology to sense an impending collision, and the like. In general, pre-crash sensing technology involves assessing a relative closing velocity between a vehicle and another object that is tracked for determining if a collision between the vehicle and other object is imminent. In the case, where a collision is imminent, a corresponding restraint deployment signal can be issued prior to initiation of the actual impact resulting from such a collision. In this regard, pre-crash sensing technology allows for increased airbag deployment time in contrast to an occupant restraint system whose restraint deployment signal is based entirely on a reactive type of sensor (e.g., accelerometer, pressure sensor, or the like). Implementations of occupant restraint systems utilizing pre-crash sensing technology are well known. Examples of pre-crash sensor based occupant restraint systems are disclosed in U.S. Pat. Nos. 8,014,921; 7,905,515; 7,243013; and 6,863,302, which are each incorporated herein by reference in their entirety.

Because the lateral thickness of an airbag that can be deployed between an occupant of a vehicle and an interior structure of the vehicle is dependent on the crash sensing time and rate of gap closure between interior structure and the vehicle occupant, advancing the crash sensing time allows a thickness of deployed airbag to be increased (relative to a deployment signal issued based on an actual impact) while simultaneously lowering or maintaining the same bag pressure. In this manner, utilization of pre-crash sensor information can be used to improve occupant protection performance (e.g. reduced rib deflection). For example, in a pole test mode, if the crash sensing time can be advanced by 3 ms, lateral thickness of a SAB can be increased by about an inch assuming a gap closure rate of 8 mm/ms.

In most instances, a single make and model of vehicle can be offered with and without pre-crash sensing technology. Advantageously, embodiments of the present invention provide for an airbag assembly that can offer a baseline level of occupant restraint protection in a vehicle having an occupant restraint system that is not configured for issuing a restraint deployment signal using pre-crash sensor information and that can also offer an enhanced level of occupant restraint protection in a vehicle having an occupant restraint system that is configured for issuing a restraint deployment signal using pre-crash sensor information. This enhanced level of occupant restraint protection is derived from the implementation of a single configuration of airbag assembly in which a lateral thickness of the airbag in a vehicle equipped with pre-crash sensing technology is greater than the lateral thickness of the airbag in a vehicle that is not equipped with pre-crash sensing technology. In this manner, embodiments of the present invention provide for an airbag assembly with a variable depth airbag that is dependent upon a type of collision sensing apparatus a vehicle is equipped with. Also, due to the predict nature of pre-crash sensing using radar, vision, lidar or ultra-sonic sensing systems, in some rare situations the pre-crash sensing system may not detect a collision situation. Therefore, it is advantageous to use an airbag assembly configured to function effectively in a vehicle equipped with pre-crash sensing system when the pre-crash sensing system does or does not detect a collision situation.

Figure 2:
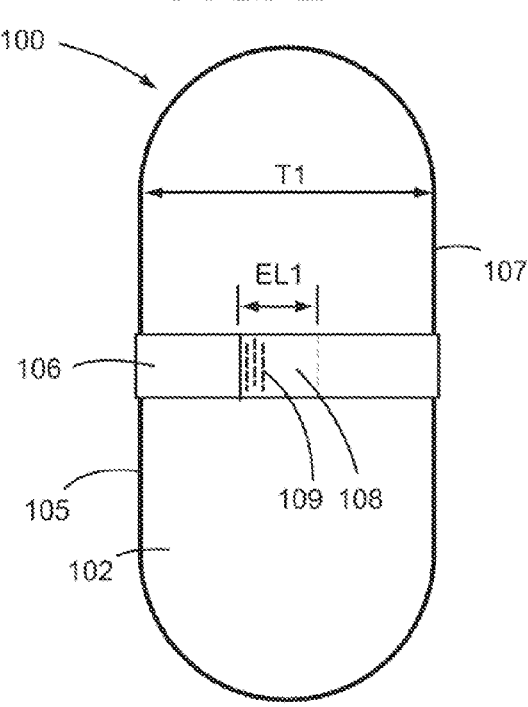
FIG. 2 is an illustrative view showing a side view of an airbag of the airbag assembly of FIG. 1 with the airbag inflated to a first lateral thickness.
Figure 3:
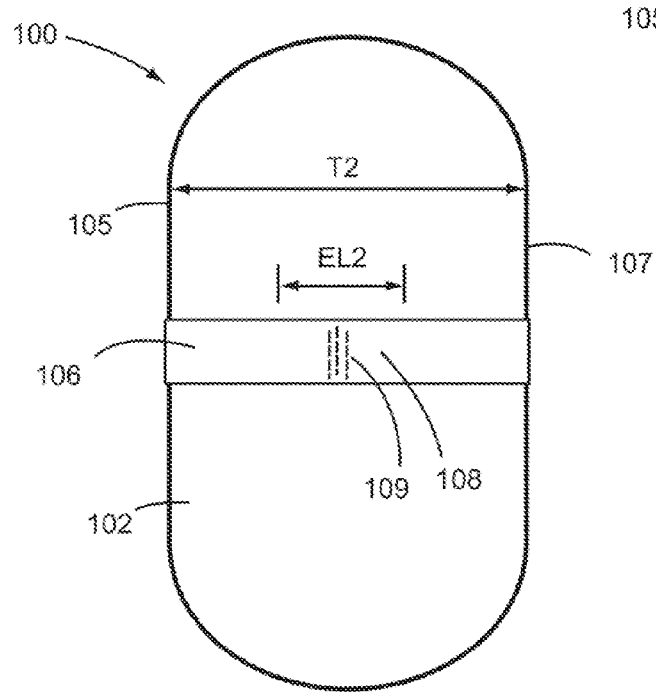
FIG. 3 is an illustrative view showing a side view of an airbag of the airbag assembly of FIG. 1 with the airbag inflated to a second lateral thickness.

Referring now to FIGS. 1-3, an airbag assembly 100 configured in accordance with an embodiment of the present invention provides adaptive features by incorporating an airbag 102 offering a variable lateral thickness and a gas emitting inflator 104 offering variable volume gas delivery. The gas emitting inflator 104 is coupled to a gas inlet structure of the airbag 102 for allowing a required amount of inflation gas to be provided (e.g., produced) by the gas emitting inflator 104 and delivered into an interior space of the airbag 102 dependent upon the sensing technology used by a corresponding collision sensing apparatus. Delivery of inflation gas into the interior space of the airbag 102 causes the airbag 102 to transition from an uninflated condition UC (FIG. 1) to a first inflated condition IC1 (FIG. 2) or a second inflated condition IC2 (FIG. 3). A distance between a vehicle structure facing side 105 and a vehicle occupant facing side 107 of the airbag 102 defines a lateral thickness of the airbag 102. The airbag 102 has a first lateral thickness T1 (FIG. 2) when in the first inflated condition IC1 and has a second lateral thickness T2 (FIG. 3), which is substantially greater than the lateral thickness T1, when in the second inflated condition IC2. A difference of as little as one-quarter inch and as much as 1 inch or more are examples of the second lateral thickness T2 being substantially greater than the lateral thickness T1. Preferably, but not necessarily, the airbag 102 has a lower operating pressure when in the second inflated condition IC2 than when in the first inflated condition IC1. Thus, the greater lateral thickness and, optionally, lower operating pressure of the airbag 102 when in the second inflated condition IC2 as compared to when in the first inflated condition IC1 results in enhance occupant protection through reduced reactive forces being exerted on an body region of an occupant that is urged against the airbag 102 during a collision in which the airbag 102 is deployed to protect the occupant.

The ability for the airbag 102 to selectively achieve two different lateral thicknesses (i.e., dual lateral thickness) is provided by a tether member 106 and the gas emitting inflator 104 being configured for allowing a plurality of different amounts of inflation gas to be selectively delivered into the airbag 102. The tether strap 106 extends between the vehicle structure facing side 105 and the vehicle occupant facing side 107 of the airbag 102. The tether strap 106 can be coupled to the airbag 102 in any number of ways such as, for example, being cinched around the uninflated airbag 102 to hold it securely in position. It is disclosed herein that ends of the tether strap 106 can be attached to a rigid support structure to which the airbag 102 and the gas emitting inflator 104 are mounted. It is also disclosed herein that the airbag of an airbag assembly configured in accordance with the present invention can have a plurality of tether members 106 integral therewith (e.g., spaced apart from each other along a height or length of the airbag) for jointly allowing the airbag to selectively achieve two different lateral thicknesses.

The tether strap 106 includes a variable length segment 108 that enables the variable thickness capability of an airbag configured in accordance with an embodiment of the present invention. Thus, the tether strap 106 is an embodiment of an airbag thickness limiting structure configured in accordance with an embodiment of the present invention. Upon inflation of the airbag 102, the tether strap 106 becomes uncinched as the airbag 102 grows in size such that the length of the tether strap increases in conjunction with the airbag 102 expanding in size up until the airbag reaches a level of inflation where the airbag reaches the first lateral thickness T1. The tether strap 106 is configured such that its overall length constrains the airbag 102 to having a lateral thickness that does not exceed the maximum lateral thickness of a first lateral thickness range (e.g., the first lateral thickness T1). The variable length segment 108 has a first effective length EL1 (FIG. 2) when a gas pressure within the interior space of the airbag 102 is below a gas pressure threshold level while the inflation gas is being delivered into the interior space, and transitions to a second effective length EL2 (FIG. 3) greater than the first effective length EL1 when the gas pressure within the interior space of the airbag 102 exceeds the gas pressure threshold level while the inflation gas is being delivered into the interior space. In this manner, the tether strap 106 limits the airbag 102 to having a lateral thickness within the first lateral thickness range when the gas emitting inflator 104 delivers a first amount of inflation gas into the interior space of the airbag 102 and, when the gas emitting inflator 104 delivers a second amount of inflation gas greater than the first amount into the interior space of the airbag 102, the tether strap 106 allows the airbag 102 to have a lateral thickness within a second lateral thickness range. Accordingly, a skilled person will appreciate that the tether strap 106 limits the airbag 102 to having a lateral thickness within a first lateral thickness range when a gas pressure within the airbag 102 is below a gas pressure threshold level and allows the airbag 102 to have a lateral thickness within a second lateral thickness range when the gas pressure within the airbag 102 exceeds the gas pressure threshold level.

In one embodiment, the variable length segment 108 includes a cinched portion that is secured with a releasable securement structure 109 (e.g., breakable stitching). The separable securement structure 109 is configured such that, when the gas pressure within the interior space of the airbag 102 exceeds the gas pressure threshold level while the inflation gas is being delivered into the interior space, a resulting force exerted on the cinch strap 106 causes the releasable securement structure 109 to release thereby allowing the variable length segment 108 to transition from its first effective length EL1 to its second effective length EL2. It is disclosed herein that embodiments of the present invention are not unnecessarily limited to any particular configuration of airbag thickness limiting structure. Accordingly, a skilled person will appreciate that other configurations of means for providing selective airbag thickness constraint in the context of the present invention can be utilized in embodiments of the present invention.

Figure 4:
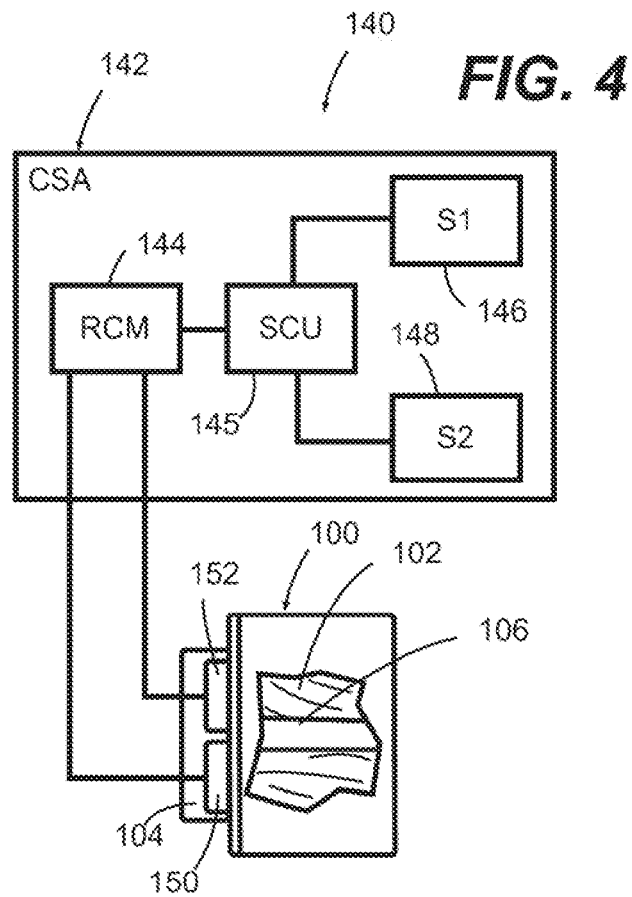
FIG. 4 is a diagrammatic view of an occupant restraint system configured in accordance with an embodiment of the present invention.

Referring now to FIG. 4, the airbag 102, the gas emitting inflator 104 and the tether strap 106 of FIGS. 1-3 are components of an occupant restraint system 140 configured in accordance with an embodiment of the present invention. The occupant restraint system 140 additionally includes a collision sensing apparatus (CSA) 142 that includes a restraint control module (RCM) 144, a sensor control unit (SCU) 145, a pre-crash sensor (S1) 146 and an impact sensor (S2) 148 (e.g., an accelerometer). The sensor control unit 145 is coupled between the restraint control module 144, the pre-crash sensor 146 and the impact sensor 148 for enabling communication of signals (i.e., information) therebetween. The restraint control module 144 is coupled between the gas emitting inflator 104 and the sensor control unit 145 for enabling communication of signals (i.e., information) therebetween. The restraint control module 144, the sensor control unit 145, the pre-crash sensor 146 and the impact sensor 148 are examples of a collision sensing apparatus configured in accordance with an embodiment of the present invention. In an alternate embodiment of the current invention, the function of the sensor control unit 145 (SCU) can be incorporated in the restraint control module 144 (RCM).

The gas emitting inflator 104 includes a first inflation gas providing element 150 and a second inflation gas providing element 152. The first inflation gas providing element 150 and the second inflation gas providing element 152 are both coupled to the airbag 102 via a suitable gas routing structure or arrangement that allows for inflation gas from each one of the gas providing elements 150, 152 to be delivered into the airbag 102 but not into each other. It is disclosed herein that the first inflation gas providing element 150 and the second inflation gas providing element 152 can be configured to output a similar amount of inflation gas or to each output a significantly different amount of inflation gas. In a preferred embodiment, the first inflation gas providing element 150 and the second inflation gas providing element 152 are pyrotechnic devices. However, embodiments of the present invention are not unnecessarily limited to any particular type of means for providing inflation gas or any particular means for allowing variable amounts of inflation gas to be selectively delivered into the airbag 102.

The first inflation gas providing element 150 provides a sufficient amount of inflation gas for causing pressure within the airbag 102 to not exceed the gas pressure threshold level. In this regard, delivery of inflation gas from only the first inflation gas providing element 150 into the airbag 102 is sufficient for causing the airbag 102 to achieve a degree of inflation where a lateral thickness of the airbag is within the first lateral thickness range (e.g., having the first lateral thickness T1) and is insufficient for causing the variable length segment 108 of the tether strap 106 to transition from its first effective length EL1 to its second effective length EL2. However, a combination of inflation gas from the first inflation gas providing element 150 and the second inflation gas providing element 152 causes a gas pressure within the airbag 102 to exceed the gas pressure threshold level and is thus sufficient for causing the variable length segment 108 of the tether strap 106 to transition from its first effective length EL1 to its second effective length EL2. Thus, when the second inflation gas providing element 152 is discharged in combination with the first inflation gas providing element 150 (e.g., at least a portion of overlapping discharge duration), pressure within the airbag 102 is sufficient for causing the airbag 102 to achieve a lateral thickness within the second lateral thickness range (e.g., having the second lateral thickness T2).

The pre-crash sensor 146 and the impact sensor 148 are used in determining a collision condition. The pre-crash sensor 146 is configured to sense relative velocity (e.g., a closing velocity) between a vehicle on which the occupant restraint system 140 is mounted and another object (e.g., another moving car or a stationary object such as a tree). The impact sensor 148 is configured to sense impact resulting from a collision between the vehicle on which the occupant restraint system 140 is mounted and another object. Accordingly, sensing of a collision condition through use of the pre-crash sensor 146 will result in output of a crash sensing signal prior to a time at which the impact sensor 148 will result in output of a crash sensing signal for the same crash event. Accordingly, the crash sensing signal of the pre-crash signal 146 is issued in advance of the crash sensing signal from impact sensor 148.

The sensor control unit 145 receives the respective crash sensing signal from the pre-crash sensor 146 and/or the impact sensor 148 for allowing the sensor control unit 145 to determine a collision condition. Thereafter, the sensor control unit 145 provides a corresponding signal to the restraint control module 144 for causing the restraint control module to activate various occupant restraint devices. The airbag 102 is one example of such an occupant restraint mechanisms. Seat belt pre-tensioners, digressive load-limiting retractors, and the like are other examples of occupant restraint mechanisms that can be controlled by the restraint control module 144.

In accordance with embodiments of the present invention, the restraint control module 144 causes activation of the first gas providing element 150 and the second gas providing element 152 when the collision condition is determined using information from the pre-crash sensor 146 and causes activation of only the first inflation gas providing element 150 (or only the second inflation gas providing element 152) when the collision condition is determined without using pre-crash sensor information. Thus, the restraint control module 144 activates the gas emitting inflator 104 to cause a first amounts of inflation gas to be delivered into the airbag 102 when the collision condition is determined without using pre-crash sensor information and causes a second amounts of inflation gas greater than the first amount to be delivered into the airbag 102 when the collision condition is determined using pre-crash sensing information. In this regard, the occupant restraint system 140 is advantageously configured to be used in vehicles equipped for providing pre-crash sensing information and in vehicles that are not equipped for providing pre-crash sensing information. Also, the occupant restraint system is advantageously configured to be used in vehicles equipped with a pre-crash sensing system when the pre-crash sensing system does or does not detect a collision situation.

Figure 5:
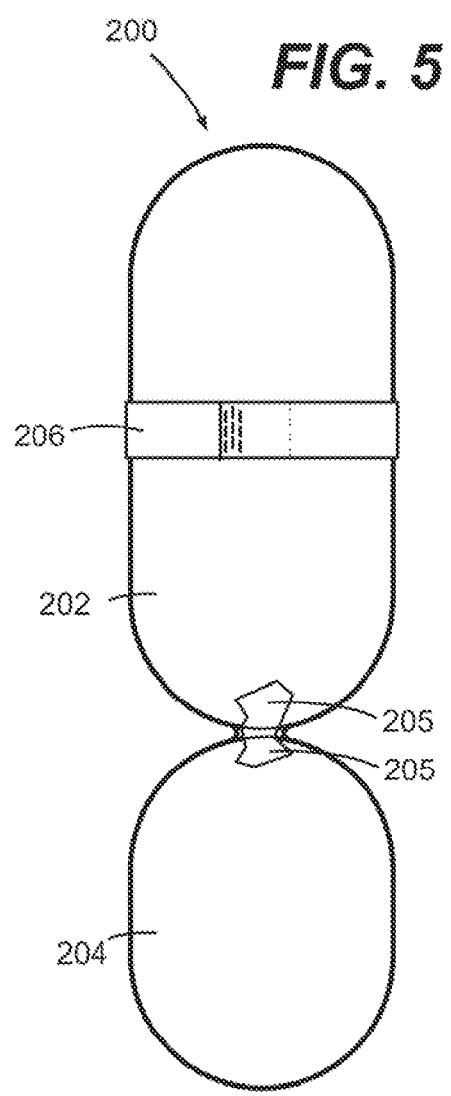
FIG. 5 is an illustrative view showing a multi-sectional assembly of an airbag configured in accordance with an embodiment of the present invention.

Embodiments of the present invention can be implemented in airbags that have a plurality of different body region engaging portions. For example, as shown in FIG. 5, a side airbag 200 has a thorax engaging portion 202 and a pelvis engaging portion 204. A tether strap 206 configured in accordance with the present invention (e.g., as described in reference to the tether strap 106) limits the thorax engaging portion 202 to having a lateral thickness within a first lateral thickness range when a first amount of inflation gas is delivered into an interior space 205 of the side airbag 200 and allows the thorax engaging portion 202 to have a lateral thickness within a second lateral thickness range when a second amount of inflation gas greater than the first amount is delivered into the interior space of the side airbag 200. The interior space 205 of the airbag extends into the thorax engaging portion 202 and the pelvis engaging portion 204. As depicted, the pelvis engaging portion 204 has a fixed maximum lateral thickness that is substantially independent of the gas pressure within the interior space of the airbag. Thus, the side airbag 200 has a first body region engaging portion and a second body region engaging portion and at least one of these body region engaging portions offers variable thickness capability in accordance with the present invention. It is disclosed herein that, for an airbag with multiple body region engaging portions, each one of such body region engaging portions can be configured to offer variable thickness capability in accordance with the present invention. It is also disclosed herein that the airbag 200 can be substituted into the airbag assembly 100 of FIGS. 1-3 in place of the airbag 102, thereby providing an airbag assembly configured in accordance with the present invention with a multi body region engaging (e.g., multi-chamber) airbag.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An occupant restraint system for a vehicle, comprising:
an airbag having an interior space for receiving inflation gas therein to cause the airbag to transition from an uninflated condition to an inflated condition, wherein the airbag includes a first body region engaging portion and a second body region engaging portion that extends from the first body region engaging portion, wherein the first body region engaging portion and the second body region engaging portion each define a respective vehicle structure facing side and a respective vehicle occupant facing side of the airbag, wherein a distance between the respective vehicle structure facing side and the respective vehicle occupant facing side of each one of said body region engaging portions of the airbag defines a lateral thickness thereof, wherein an interior space of the airbag extends into the first body region engaging portion and the second body region engaging portion, and wherein the second body region engaging portion has a substantially fixed maximum attainable lateral thickness;
an airbag thickness limiting structure coupled to the first body region engaging portion of the airbag for allowing the lateral thickness of the first body region engaging portion to be varied dependent upon an amount of inflation gas delivered into the interior space of the airbag from the gas emitting inflator, wherein the airbag thickness limiting structure limits the first body region engaging portion of the airbag to having a lateral thickness within a first lateral thickness range when a gas pressure within the airbag is below a gas pressure threshold level and allows the first body region engaging portion of the airbag to have a lateral thickness within a second lateral thickness range when the gas pressure within the first body region engaging portion of the airbag exceeds the gas pressure threshold level;
a gas emitting inflator coupled to a gas inlet structure of the airbag, wherein the gas emitting inflator is configured for selectively providing a commanded one of a plurality of different amounts of inflation gas to be delivered into the interior space of the airbag through the gas inlet structure, wherein a first one of said different amounts of inflation gas corresponds to the airbag being inflated to achieve a gas pressure therein below the gas pressure threshold level, and wherein a second one of said different amounts of inflation gas corresponds to the airbag being inflated to achieve a gas pressure therein that exceeds the gas pressure threshold level; and
a collision sensing apparatus coupled to the gas emitting inflator for activating the gas emitting inflator in response to the collision sensing apparatus determining a collision condition is met, wherein activating the gas emitting inflator causes the first one of said different amounts of inflation gas to be delivered into the airbag when determining the collision condition is performed without using pre-crash sensor information and causes the second one of said different amounts of inflation gas to be delivered into the airbag when determining the collision condition includes using information from a pre-crash sensor of the collision sensing apparatus.

2. The occupant restraint system of claim 1 wherein:
the gas emitting inflator includes a plurality of inflation gas providing elements;
the collision sensing apparatus causes activation of at least two of said inflation as providing elements when the collision condition is determined using information from the pre-crash sensor and causes activation of only one of said inflation gas providing elements when the collision condition is determined without using pre-crash sensor information.

3. The occupant restraint system of claim 1 wherein:
the gas emitting inflator includes a first inflation gas providing element and a second inflation gas providing element;
the first inflation gas providing element is configured to produce the first one of said different amounts of inflation gas; and
the first inflation gas providing element and the second inflation gas providing element are jointly configured to produce the second one of said different amounts of inflation gas.

4. The occupant restraint system of claim 3 wherein the collision sensing apparatus causes activation of the first gas providing element and the second gas providing element when the collision condition is determined using information from the pre-crash sensor and causes activation of only the first inflation gas providing element when the collision condition is determined without using pre-crash sensor information.

5. The occupant restraint system of claim 4 wherein:
the airbag thickness limiting structure includes a tether strap extending between the vehicle structure facing side and the vehicle occupant facing side of the first body region engaging portion of the airbag;
the tether strap includes a variable length segment; and
the variable length segment of the tether strap has a first effective length when a gas pressure within the interior space of the airbag is below a gas pressure threshold level while the inflation gas is being delivered into the interior space and transitions to a second effective length greater than the first effective length when the gas pressure within the interior space of the airbag exceeds the gas pressure threshold level while the inflation gas is being delivered into the interior space.

6. A method, comprising:
    determining a configuration of a sensor arrangement of a collision sensing apparatus of a vehicle available for detecting a collision between the vehicle and another object;
    enabling a gas emitting inflator of the vehicle to delivered a first amount of inflation gas into an interior space of an airbag in response to determining that the sensor arrangement is not configured to provide pre-crash sensing information and to deliver a second amount of inflation gas into the interior space of the airbag in response to determining that the sensor arrangement is configured to provide pre-crash sensing, information, wherein the airbag includes a first body region engaging portion and a second body region engaging portion that extends from the first body region engaging portion, wherein the first body region engaging portion and the second body region engaging portion each define a respective vehicle structure facing side and a respective vehicle occupant facing, side of the airbag, wherein a distance between the respective vehicle structure facing side and the respective vehicle occupant facing side of each one of said body region engaging portions of the airbag defines a lateral thickness thereof, wherein an interior space of the airbag extends into the first body region engaging portion and the second body region engaging portion, and wherein the second body region engaging portion has a substantially fixed maximum attainable lateral thickness, wherein the first amount of inflation gas is insufficient for causing an airbag thickness limiting structure of the first body region engaging portion of the airbag to transition from a first airbag thickness configuration to a second airbag thickness configuration as said inflation gas causes the airbag to transition from an uninflated condition to a first fully inflated condition, and wherein the second amount of inflation gas is sufficient for causing the airbag thickness limiting structure of the first body region engaging portion of the airbag to transition from the first airbag thickness configuration to the second airbag thickness configuration as said inflation gas causes the airbag to transition from the uninflated condition to a second fully inflated condition, wherein a maximum attainable lateral thickness of the first, body region engaging portion of the airbag corresponding to the first fully inflated condition is less than a maximum attainable lateral thickness of the first body region engaging portion of the airbag corresponding to the second fully inflated condition; and
    activating the gas emitting inflator in response to the collision sensing apparatus determining a collision condition is met thereby causing said inflation gas generated thereby to be delivered into the interior space of the airbag, wherein activating the gas emitting inflator causes the first amount of inflation gas to be delivered into the interior space of the airbag when the sensor arrangement is determined to not be configured to provide pre-crash sensing information and causes the second amount of inflation gas to be delivered into the interior space of the airbag when the sensor arrangement is determined to be configured to provide said pre-crash sensing information.

7. The method of claim 6 wherein activating the gas emitting inflator causes activation of a plurality of inflation gas providing elements of the gas emitting inflator when the collision condition is determined using information from the pre-crash sensor and causes activation of only a single one of said inflation gas providing elements when the collision condition is determined without using pre-crash sensor information.

8. The method of claim 7 wherein:
    the airbag thickness limiting structure includes a tether strap extending between the vehicle structure facing side and the vehicle occupant facing side of the first body region engaging portion of the airbag;
    the tether strap includes a variable length segment; and
    the variable length segment of the tether strap has a first effective length when a gas pressure within the interior space of the airbag is below a gas pressure threshold level while the inflation gas is being delivered into the interior space and transitions to a second effective length greater than the first effective length when the gas pressure within the interior space of the airbag exceeds the gas pressure threshold level while the inflation gas is being delivered into the interior space.

9. The method of claim 6 wherein:
    the gas emitting inflator includes a first inflation gas providing element and a second inflation gas providing element;
    the first inflation gas providing element is configured o produce the first amount of inflation gas;
    the first inflation gas providing element and the second inflation gas providing element are jointly configured to produce the second amount of inflation gas;
    activating the gas emitting inflator to cause the first amount of inflation gas to be delivered into the interior space of the airbag includes activating only the first inflation gas providing element; and
    activating the gas emitting inflator to cause the second amount of inflation gas to be delivered into the interior space of the airbag includes activating the fast inflation gas providing element and the second inflation gas providing element.

10. The method of claim 6 wherein;
    the gas emitting inflator includes a first inflation gas providing element and a second inflation gas providing element;
    the first inflation gas providing element is configured to produce the first amount of inflation gas;
    the first inflation gas providing element and the second inflation gas providing element are jointly configured to produce the second amount of inflation gas;
    activating the gas emitting inflator causes activation of the first inflation gas providing element and the second inflation gas providing element when the collision condition is determined using information from the pre-crash sensor and causes activation of only a single one of said inflation gas providing elements when the collision condition is determined without using pre-crash sensor information.

* * * * *